June 23, 1959 D. LEYPOLD ET AL 2,892,042

AMPLIFICATION REGULATION IN MULTI-STAGE AMPLIFIER APPARATUS

Filed Nov. 30, 1954 2 Sheets-Sheet 1

Inventors
Dieter Leypold, &
Peter Schucht.
By [signature] Atty.

Inventors.
Dieter Leypold, &
Peter Schucht,
By. [signature] Atty.

United States Patent Office 2,892,042

Patented June 23, 1959

2,892,042

AMPLIFICATION REGULATION IN MULTI-STAGE AMPLIFIER APPARATUS

Dieter Leypold and Peter Schucht, Munich, Germany, assignors to Siemens & Halske Aktiengesellschaft, Munich and Berlin, Germany, a German corporation Application November 30, 1954, Serial No. 472,186

Claims priority, application Germany December 15, 1953

4 Claims. (Cl. 179—171)

Figure 1:
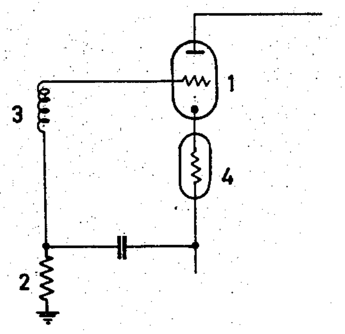

This invention is concerned with amplification regulation in multi-stage amplifier apparatus.

In the simultaneous transmission of a plurality of messages over one frequency channel, there must be exercised particular care to avoid nonlinear cross talk between the messages to be transmitted simultaneously. A case in point is, for example, present with commercial and especially with single side band receivers which have to absorb a plurality of messages simultaneously. It is particularly necessary in such a case to arrange the amplification regulation for the automatic equalization of fading effects so as to avoid detriments regarding the linearity of the amplifier. Amplification regulation by variations of the amplitude characteristics are in such cases not particularly suitable.

It is known to maintain linearity of amplifiers by effecting the amplification regulation by the use of a regulable negative feedback. In case the amplification regulation is to be effected by a direct bias voltage, this can be done, for example, by affecting the negative feedback by the use of current dependent resistors disposed in the negative feedback path, for example, thermistors traversed by current which is derived from the direct bias voltage, for example, the plate current of the tube receiving the direct bias voltage as a grid bias. Such circuits have, however, the disadvantage that the range of amplification regulation is for many cases too small without causing deterioration of the linearity.

As compared with this situation, the invention shows ways and means for increasing the regulation range of the amplification or gain very considerably by affecting the negative feedback without altering the working characteristics of the tubes and at the same time improving the linearity of the amplifier unit with increasing negative feedback.

In the case of an amplifier unit whose amplification is by means of a direct bias voltage regulated within a wide range with maintenance of high linearity, by variation of the negative feedback, the negative feedback voltage formed in one of the amplifier stages is, in accordance with the invention fed back to another amplification stage over a voltage divider containing one or more current dependent resistors, preferably over thermistors, whereby the voltage divider ratio is affected by a direct current derived from the direct bias voltage.

In accordance with another feature of the invention, the individual amplification stages, especially the stage from which the negative feedback voltage is fed back and the stage to which such voltage is conducted, are provided with auxiliary means for regulating the negative feedback, such auxiliary regulation being effected in the current dependent resistors disposed in the corresponding negative feedback path, particularly thermistors, by the direct bias current. Accordingly, an amplifier unit according to the invention may be arranged so that two cathodes grounded over resistors, preferably thermistors, and blocked by capacitors against the direct cathode current are connected over a voltage divider containing one or more resistors, preferably thermistors, in such a manner that a direct current derived from the direct bias voltage flows through the cathode resistors and also through the resistors of the voltage divider arrangement.

The direct regulation current may be derived in particularly simple manner from the direct bias voltage over a direct current amplifier.

In accordance with a further feature of the invention, the direct bias voltage may not only flow through the resistors contained in the regulated amplifier unit but especially for the actuation of a further amplification regulation also in other circuit elements containing current depending resistors.

Figure 4:
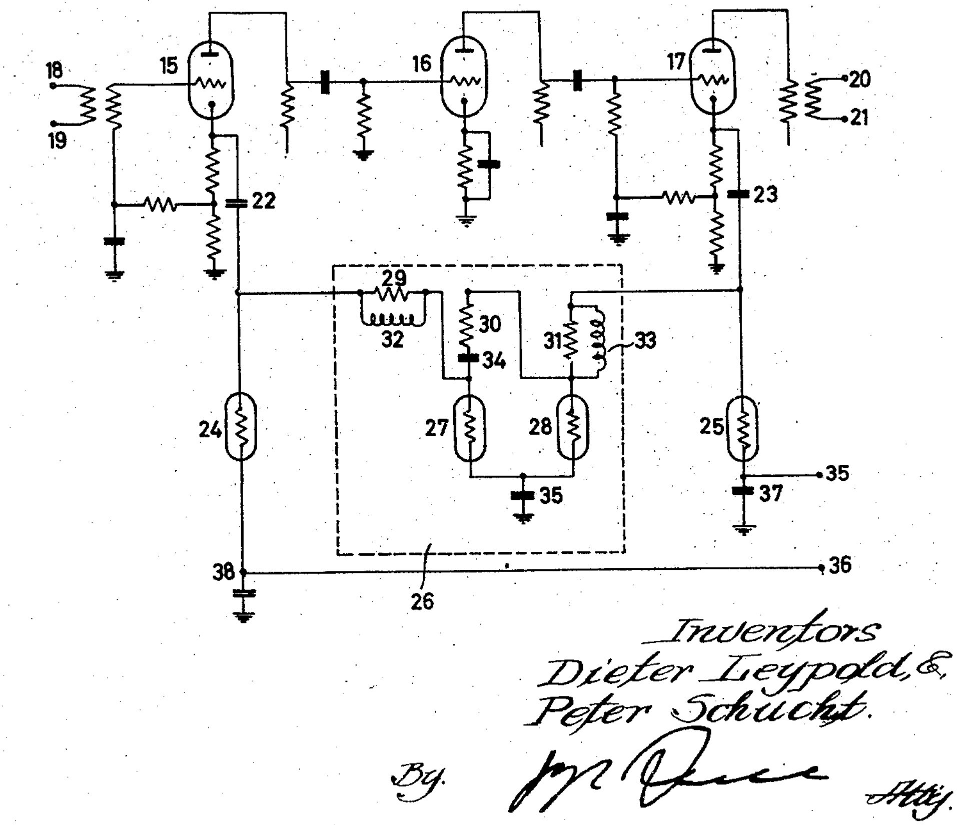
Figure 2:
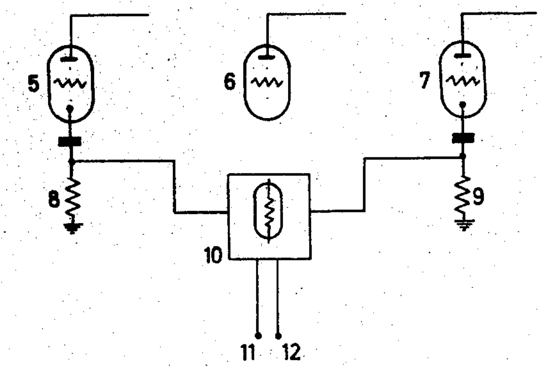
Figure 3:
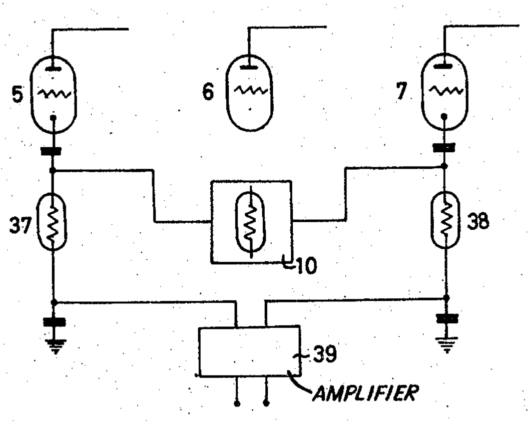

The invention will now be described with reference to the accompanying drawings, wherein Fig. 1 shows a simple example illustrating a known arrangement;

Figs. 2 and 3 show simplified explanatory circuits to aid the understanding of the principles of the invention; and Fig. 4 shows an embodiment of the invention which may be variously modified by known means.

In the known arrangement according to Fig. 1, the grid of an amplifier tube 1 receives the direct bias voltage over the resistor 2 and the coil 3. In the cathode circuit is disposed the thermistor 4 at which the negative feedback voltage occurs. In such a circuit, the plate current may vary within larger or smaller values without noticeably affecting the steepness of the tube characteristic. The amplification regulation is obtained due to the fact that the negative feedback voltage at the cathode resistor is on account of the current dependence of the thermistor resistance high at low current and low at high plate current. As has been said before, such and similar arrangements exhibit the disadvantage that the range of the amplification regulation is without deterioration of the linearity for many cases too narrow.

In Fig. 2, numerals 5, 6 and 7 represent three serially arranged amplifier tubes of an amplifier unit. The cathodes of the tubes 5 and 7 are connected with ground over the resistors 8 and 9, respectively, for the alternating voltage to be amplified, and are further for the alternating voltage to be amplified connected with each other over a voltage divider shown diagrammatically at 10 and containing one or more thermistors. The thermistors of the voltage divider 10 are traversed by a direct current bias voltage conducted to the terminals 11 and 12 which is derived from the bias voltage. An amplification without alteration of the work characteristics of the amplifier tubes 5 and 7 is possible provided that the voltage divider 10 is so constructed that the negative feedback voltage fed back from the cathode of the tube 7 to the cathode of tube 5 changes with the magnitude of the bias current. Particularly advantageous is in this circuit principle according to the invention the fact that the feed back voltage increases with progressively lower amplification so that the linearity is progressively improved.

The circuit illustrated in Fig. 3 adds to the showing of Fig. 2 an auxiliary regulation of the negative feedback for the amplifier tubes 5 and 7 as such. This is obtained by substituting thermistors 37 and 38 for the resistors 8 and 9 of Fig. 2 and connecting these thermistors in a direct current circuit with thermistors contained in the voltage divider 10 so that the output current from a direct current amplifier 39, to which is conducted the direct bias voltage, controls all the thermistors.

The circuit according to Fig. 3, as compared with Fig. 2, provides for considerable increase of the regulation range. A circuit utilizing the principles employed in Fig.

3 provides, first, the regulation effect of the voltage divider arrangement 10 whose range cannot be arbitrarily increased for reasons of stability, and second, the additional regulation effect which is obtained at the amplifier tubes 5 and 7 by the negative feedback changes by means of the thermistors traversed by the bias current.

Fig. 4 illustrates the principal components provided in an amplifier made according to the invention and utilizing the principles explained with reference to Figs. 2 and 3.

The unit which is to be regulated as to its degree of amplification or gain contains three tube stages with their amplifier tubes 15, 16, 17, such tubes being in usual manner coupled over capacitors, inductances and resistors. The alternating voltage which is to be amplified is conducted to the terminals 18 and 19; the amplified alternating voltage is delivered at the terminals 20 and 21. The cathodes of the tubes 15 and 17 are for the alternating voltage to be amplified connected with thermistors 24 and 25 which are blocked against the direct cathode current by means of the capacitors 22 and 23, respectively. The cathode ends of these thermistors 24 and 25 are interconnected over circuit arrangement generally indicated at 26 (numeral 10 in Fig. 3) containing in addition to two thermistors 27 and 28 resistors 29, 30 and 31, chokes 32 and 33, and capacitors 34 and 35.

This circuit arrangement 26 fulfills simultaneously two conditions, namely, first, when direct current derived from a bias voltage on the grid of tube 15 is conducted to terminal 36, it will serially flow through the thermistors 24, 27, 28, and 25; and, second, the device 26 forms a multiple voltage divider for the negative feedback voltage fed back from the cathode of the tube 17 to the cathode of the tube 15, the partial voltage ratio of the voltage divider being dependent on the current. The first current dependent voltage division comprises the series circuit containing the resistor 31 and the thermistor 28; the second comprises the resistor 30 and the thermistor 27; and the third comprises the resistor 29 and the thermistor 24.

The chokes 32 and 33 serve for the direct current bridging of the resistors 29 and 31, respectively; the capacitor 34 compels the direct bias current to flow serially through the two thermistors 27 and 28.

As already noted with reference to the explanatory circuit shown in Fig. 3, the circuit according to Fig. 4 permits to obtain a particularly great regulation range without altering the characteristics of the amplifier tubes, that is, without deterioration of the linearity, due to the fact that, in addition to their own negative feedback of two amplifier tubes over thermistors in the cathode circuits, the negative feedback voltage of the tube 17 is in multiple current dependent manner fed back to the cathode of the tube 15.

Cold conductors or a combination of thermistors and cold conductors may be used in the voltage divider arrangement in place of the thermistors shown.

It is also possible to use in place of a special direct current amplifier for connecting to terminal 36 a direct current derived from a direct bias voltage, the plate current of the first amplifier tube 15 in Fig. 4, since this tube is least active. In such a case, the direct bias voltage is conducted to the grid of such tube in addition to the alternating voltage which is to be amplified. In order to obtain great regulation speed, it is suitable to employ current dependent resistors, for example, thermistors with a thermal time constant as small as possible.

The practical use of the circuit according to Fig. 4 has brought surprising results. An amplifier constructed in accordance with this circuit, that is, incorporating the features thereof, showed a regulation range betwen 4 N and 12 N while maintaining good linearity.

Changes may be made within the scope and spirit of the appended claims which define what is believed new and desired to have protected by Letters Patent.

We claim:

1. In an amplifier apparatus having a plurality of amplifier stages, a device for regulating the amplification by controlling by the use of a direct bias voltage the negative feedback within a relatively great regulation range while substantially maintaining linearity, said device comprising a voltage divider network operatively connecting a following amplifier stage with a preceding stage for feeding a negative feedback voltage developed in such following stage to the preceding stage, said network being operatively connected to the cathodes of said amplifier stages by respective direct current blocking capacitors, said voltage divider network comprising elements forming parallel direct and alternating current paths, said direct current path having a plurality of thermistors disposed therein, and means for causing direct current derived from said direct bias voltage to flow through said direct current path and directly through all said thermistors therein.

2. The structure and cooperation of parts as defined in claim 1, comprising respective thermistors at the input and output ends of said voltage divider network and operatively connected in series with the direct current path of the latter, said direct current derived from said direct bias voltage being operatively connected to the series circuit thus formed whereby such current will flow through the latter.

3. The structure and cooperation of parts as defined in claim 1, comprising means for operatively connecting the direct current path of said voltage divider network to the cathode of said first amplifier stage whereby the direct current flowing through said network is a derivative of the anode current in said first amplifier stage.

4. The structure and cooperation of parts as defined in claim 2, comprising means for operatively connecting said series circuit to the cathode of said first amplifier stage whereby the direct current flowing through said network is a derivative of the anode current in said first amplifier stage.

References Cited in the file of this patent

UNITED STATES PATENTS

| | | |
|---|---|---|
| 2,178,333 | Blair | Oct. 31, 1939 |
| 2,212,337 | Brewer | Aug. 20, 1940 |
| 2,224,699 | Rust | Dec. 10, 1940 |
| 2,337,423 | Stillwell | Dec. 21, 1943 |
| 2,468,082 | Chatterjea et al. | Apr. 26, 1949 |
| 2,548,901 | Moe | Apr. 17, 1951 |